(12) United States Patent
Subramanian et al.

(10) Patent No.: US 10,924,907 B2
(45) Date of Patent: Feb. 16, 2021

(54) APPARATUS OF A USER EQUIPMENT ADAPTED FOR RECEIVING EMERGENCY NOTIFICATION INFORMATION USED IN MOBILE COMMUNICATION AND METHOD FOR RECEIVING EMERGENCY NOTIFICATION INFORMATION

(71) Applicant: Apple Inc., Cupertino, CA (US)

(72) Inventors: Kumaran Subramanian, Nuremberg (DE); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/607,709

(22) Filed: May 30, 2017

(65) Prior Publication Data
US 2018/0007525 A1    Jan. 4, 2018

(30) Foreign Application Priority Data
Jul. 1, 2016  (EP) ..................................... 16177468

(51) Int. Cl.
| | |
|---|---|
| *H04W 4/90* | (2018.01) |
| *H04H 20/57* | (2008.01) |
| *H04H 20/59* | (2008.01) |
| *H04H 20/72* | (2008.01) |
| *H04W 48/16* | (2009.01) |

(52) U.S. Cl.
CPC .............. *H04W 4/90* (2018.02); *H04H 20/57* (2013.01); *H04H 20/59* (2013.01); *H04H 20/72* (2013.01); *H04W 48/16* (2013.01)

(58) Field of Classification Search
CPC ........ H04H 20/57; H04H 20/59; H04H 20/72; H04W 4/22; H04W 4/90; H04W 48/16
See application file for complete search history.

(56) References Cited

U.S. PATENT DOCUMENTS

| | | | |
|---|---|---|---|
| 2006/0084438 A1* | 4/2006 | Kwon ................... | H04W 36/30 455/436 |
| 2006/0178128 A1* | 8/2006 | Eaton ...................... | H04W 4/22 455/404.1 |
| 2006/0184962 A1* | 8/2006 | Kendall ............... | G08B 27/008 725/33 |
| 2007/0184834 A1* | 8/2007 | Jeong ................... | H04W 36/32 455/434 |

(Continued)

OTHER PUBLICATIONS

The extended European search report based on Application No. 16177468.2(6 Pages) dated Dec. 8, 2016 (Reference Purpose Only).

(Continued)

*Primary Examiner* — Dinh Nguyen
(74) *Attorney, Agent, or Firm* — Kowert, Hood, Munyon, Rankin & Goetzel, P.C.

(57) ABSTRACT

A communication device is provided comprising a receiver configured to detect whether it can receive emergency notification information of a radio cell and, if it cannot receive the emergency notification information of the radio cell, search for another radio cell based on the possibility to receive emergency notification information of the other radio cell. Further, the communication device comprises a controller configured to, if the receiver has found another radio cell based on the possibility to receive emergency notification information of the other radio cell, initiate a reselection of the other radio cell.

20 Claims, 6 Drawing Sheets

(56) References Cited

U.S. PATENT DOCUMENTS

| | | | |
|---|---|---|---|
| 2009/0104905 A1* | 4/2009 | DiGirolamo | H04J 11/0093 455/434 |
| 2009/0239554 A1* | 9/2009 | Sammour | H04W 4/22 455/458 |
| 2010/0213013 A1* | 8/2010 | Urata | B66B 5/022 187/278 |
| 2011/0105074 A1* | 5/2011 | Wu | H04W 76/19 455/404.1 |
| 2011/0237218 A1 | 9/2011 | Aoyama et al. | |
| 2012/0040636 A1* | 2/2012 | Kazmi | H04W 4/90 455/404.2 |
| 2013/0109391 A1* | 5/2013 | Lee | H04W 48/12 455/436 |
| 2013/0150105 A1* | 6/2013 | Clevorn | H04W 48/12 455/501 |
| 2013/0303114 A1* | 11/2013 | Ahmad | H04W 16/14 455/406 |
| 2014/0179258 A1* | 6/2014 | Arzelier | H04W 4/22 455/404.1 |
| 2014/0357183 A1 | 12/2014 | Rathonyi et al. | |
| 2015/0351011 A1* | 12/2015 | Shukla | H04W 48/16 455/434 |
| 2015/0382168 A1 | 12/2015 | Sammour et al. | |
| 2016/0277982 A1* | 9/2016 | Jung | H04W 48/18 |
| 2016/0316421 A1* | 10/2016 | Barakam | H04W 48/16 |
| 2017/0006604 A1* | 1/2017 | Challa | H04W 4/90 |

OTHER PUBLICATIONS

3GPP, "Digital cellular telecommunications system (Phase 2+); Universal Mobile Telecommunications System (UMTS); Public Warning System (PWS) requirements", Technical specification, Oct. 2014, TS 22.268 version 12.2.0 Release 12, ETSI, France.

3GPP, "LTE; Evolved Universal Terrestrial Radio Access (E-UTRA); Physical layer; Measurements", Technical specification, Apr. 2015, TS 36.214 version 12.2.0 Release 12, ETSI, France.

3GPP, "LTE; Evolved Universal Terrestrial Radio Access (E-UTRA); User Equipment (UE) procedures in idle mode", Technical specification, Jul. 2015, TS 36.304 version 12.5.0 Release 12, ETSI, France.

3GPP, "LTE; Evolved Universal Terrestrial Radio Access (E-UTRA); Radio Resource Control (RRC); Protocol specification", Technical specification, Jul. 2015, TS 36.331 version 12.6.0 Release 12, ETSI France.

* cited by examiner

… … US 10,924,907 B2 …

APPARATUS OF A USER EQUIPMENT ADAPTED FOR RECEIVING EMERGENCY NOTIFICATION INFORMATION USED IN MOBILE COMMUNICATION AND METHOD FOR RECEIVING EMERGENCY NOTIFICATION INFORMATION

CROSS-REFERENCE TO RELATED APPLICATIONS

This application claims priority to European Patent Application Serial No. 16 177 468.2, which was filed on Jul. 1, 2016, and is incorporated herein by reference in its entirety.

TECHNICAL FIELD

Embodiments described herein generally relate to apparatuses of a user equipment adapted for receiving emergency notification information used in mobile communication and methods for receiving emergency notification information.

BACKGROUND

Modern mobile communication networks are typically used for distribution of emergency notification information such as Earthquake and Tsunami Warning System information. According the nature of this information, mobile terminals should be able to receive this information with high reliability. Accordingly, approaches to increase the reliability of reception of emergency notification information are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
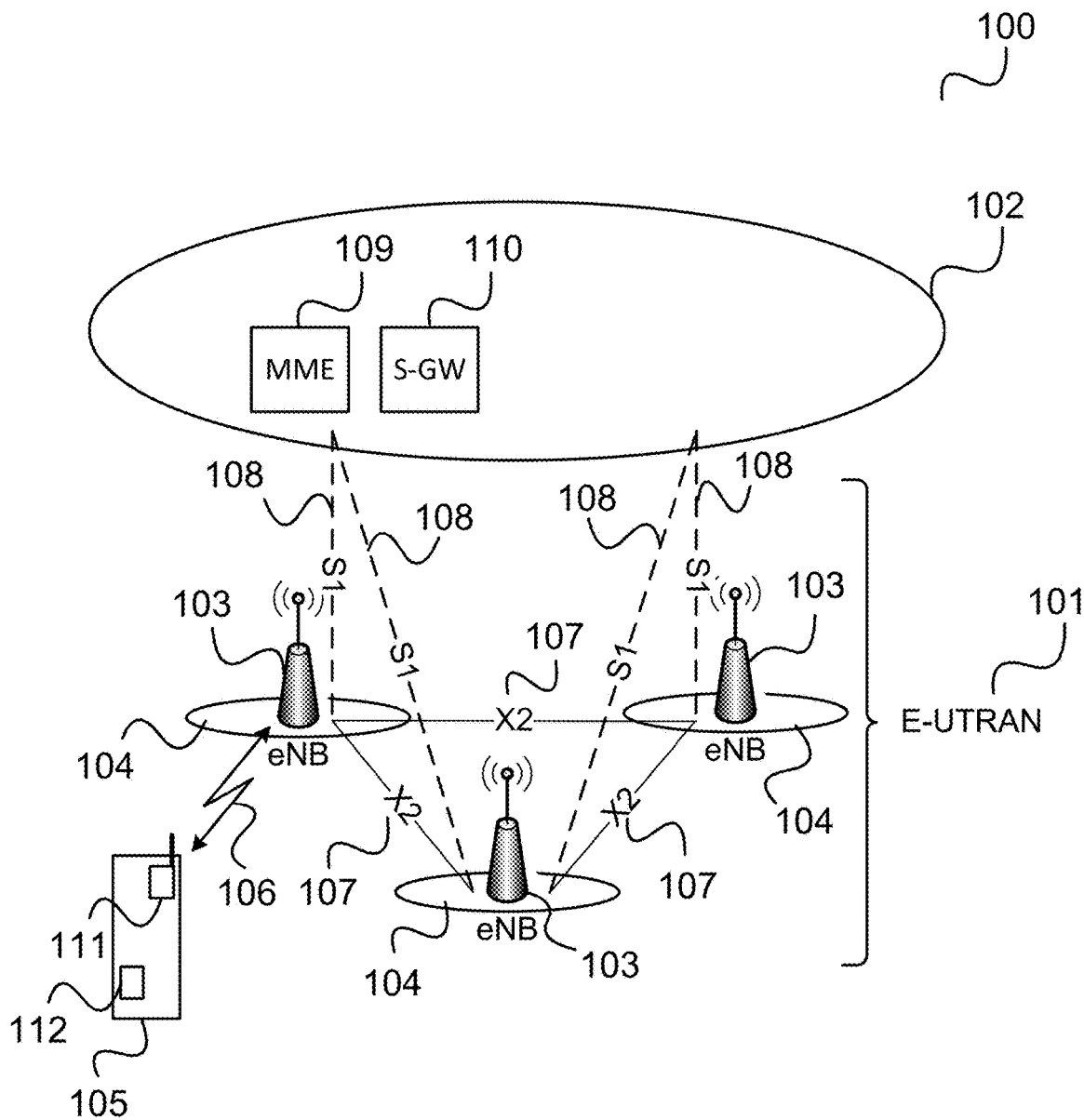
FIG. 1 shows a communication system, e.g. an LTE (Long Term Evolution) communication system as specified by 3GPP (Third Generation Partnership Project).

FIG. 1 shows a communication system 100, e.g. an LTE (Long Term Evolution) communication system as specified by 3GPP (Third Generation Partnership Project).

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in one of the mobile radio cells 104 (in this example the leftmost radio cell 104) may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), GPRS (General Packet Radio Service), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network. The approaches described herein may also be applied to future RAT technologies such as 5G.

The base stations 103 broadcast system information, including a master information block (MIB) and system information blocks (SIB1, SIB2, . . . ). According to LTE, MIB, SIB1 and SIB2 are specified as essential system information. This means that if the mobile terminal 105 fails to acquire one of them in a radio cell 103 (i.e. from the respective base station operating the radio cell 103) the mobile terminal 105 bars the cell for up to 300 seconds.

An eNB (base station) 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109);

CSG (Closed Subscriber Group) handling.

Control of a call may occur between base stations 103 operating according to different radio access technologies (RATs) such as UMTS and GSM. This is illustrated in FIG. 2.

Figure 2:
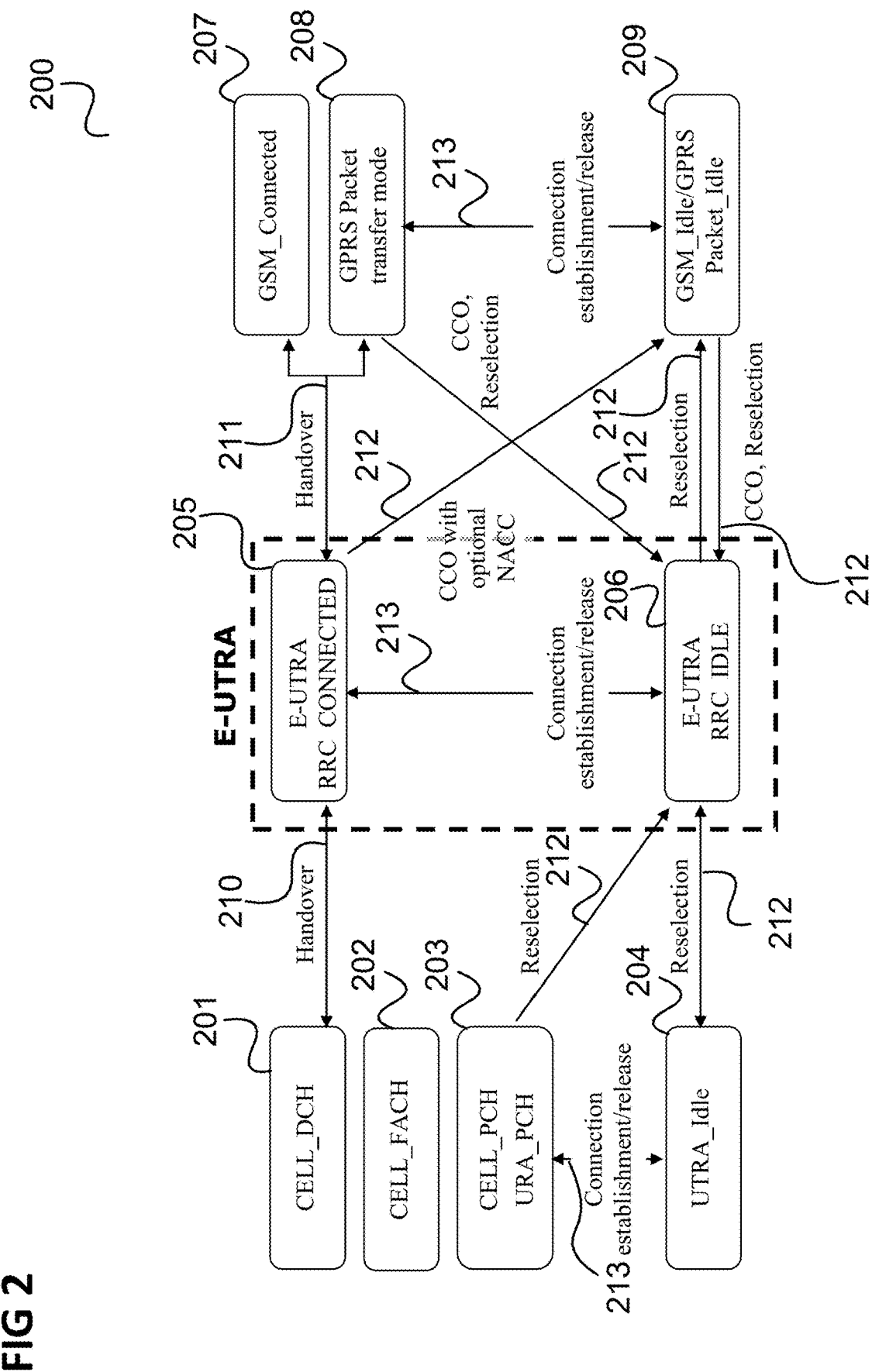
FIG. 2 shows a state diagram illustrating mobile terminal states.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a transfer of a connection may be carried out between E-UTRA (i.e. a base station 103 operating according to LTE) and UTRAN (i.e. a base station 103 operating according to UTMS).

According to a second state transition 211, a transfer of a connection may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the transfer of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

According to LTE, the radio access network 101 may notify the mobile terminal 105 about an emergency, i.e. send emergency notification information to the mobile terminal 105 such as etws (Earthquake and Tsunami Warning System) information.

For this, while being camped on a cell, the mobile terminal 105 (also referred to as UE in the following according to LTE) reads system information (including SIB1) from the current serving cell (i.e. the radio cell 104 on which the UE camps) to detect whether the base station 103 operating the serving cell transmits scheduling information for PWS (Public Warning System) SIBs. However, when camped on a cell, definite criteria are not specified according to the current 3GPP specification when (e.g. after how many attempts) the UE should to bar and leave the current cell if SIB1 reception fails.

Unlike MIB, SIB1 and SIB2, PWS (Public Warning System) SIBs (i.e. SIBs used for transmitting emergency notification information) are not specified as essential SIBs in the current 3GPP specification and no criteria are defined specifying what should be done if the UE 105 is unable to acquire those SIBs. Further, it is not specified if UE 105 is allowed to leave the cell at all and it is not specified either when the UE 105 should leave the cell (i.e. after how many failure attempts to receive PWS SIBs).

However, if the UE 105 does not leave the cell and the interference situation causing PWS SIB acquisition failure does not improve, the UE is stuck within the cell in which PWS warning notification service is not available and will not be able to receive PWS warning notifications (i.e. loses PWS warning notifications) until the UE leaves the cell, e.g. based on regular cell reselection/selection criteria.

Simply barring the cell as specified for essential SIBs and reselecting to a new cell may lead to a possible disruption in service and the PWS SI reception issue may repeat in the new cell.

In view of the above, according to various embodiments, approaches are provided for a UE to find and reselect to a suitable cell where PWS SIBs reception is possible as early as possible whenever PWS SIB acquisition failure is observed in the current camped cell.

For example, the UE performs the following:

Detect a system information acquisition failure based on a time window criterion for SIB1 and PWS SIBs When a system information acquisition failure is detected for SIB1 or PWS SIBs, detect availability of a suitable neighbor cell where obtaining PWS SIBs is possible before leaving the current cell If suitable neighbor cell is available reselect to it and bar the current cell (i.e. the source cell of the reselection) where the system information acquisition failure occurred to avoid Ping-Pong reselections until the interference situation observed on the source cell has improved.

For example, an approach includes:

A rule to detect a SIB1 or PWS SI reception failure (whereas the current 3GPP specification is mute on this).

The UE proactively identifying reselection candidates by enabling neighbor measurements (overruling the measurement rules specified according to the current 3GPP specification) early enough once a SIB1 or PWS SI reception failure is observed.

The UE finding a suitable cell where PWS reception is possible (and which not just fulfills the suitability criteria according to the current 3GPP specification) prior to leaving the current cell by acquiring neighbor cells' SIB1 and PWS SI. This means that the UE does not select a cell for cell reselection that is suitable according to 3GPP, i.e. which for example fulfills the cell selection criteria according to 3GPP, but selects a cell for cell reselection in which PWS (or generally emergency notification information) reception is possible.

For example, a time to declare that the UE is facing persistent a PWS system information acquisition failure for any SIs may be defined and used by the UE to detect a PWS system information acquisition failure as follows. If the UE is unable to decode a PWS SI for two consecutive times within the siWindow (system information window) for the respective SI message (i.e. the maximum time to detect a SI acquisition failure for a particular SI message will be 2*siPeriodicity (system information periodicity)+siWindowLength (length of system information transmission window)), then the UE decides that an SI acquisition failure for PWS SI has occurred. Alternatively, once the UE receives paging with an etws-Indication (i.e. an indication that etws information is transmitted) is received, the UE immediately acquires SIB1 to get PWS SI scheduling information but if the SIB1 acquisition fails consecutively for 160 ms (two original SIB1 repetition) then the UE decides that an SI acquisition failure for PWS SI has occurred.

The UE may, along with 3GPP specified RSRP (Reference Signal Received Power) & RSRQ (Reference Signal Received Quality) measurements, perform an additional RSSNR measurements (Reference Signal-Signal to Noise ratio, i.e. a signal to noise ratio measurement which is not influenced by the load on the target cell) at the time of SI acquisition failure.

The UE may then store the results of the RSRP, RSRQ and RSSNR measurements at the time of SI acquisition failure. When multiple SI acquisition failures occur consecutively, the UE may for example store those measurements which correspond to the highest values observed at the time of one of the SI acquisition failures.

Once an SI acquisition failure has been detected for PWS SIs intrafrequency, interfrequency and interRAT neighbor measurements are enabled in the UE (if not enabled already) irrespective of regular measurement rules, for example irrespective of whether the RSRQ and RSRP are below the regular respective thresholds.

If one or more suitable neighbor cells are available
  If there is a better ranked neighbor cell available and the RSSNR of the cell is better than the minimum required RSSNR (i.e. the MIN_RSSNR_THRESHOLD), the UE triggers reselection to that neighbor cell.
  If the neighbor cells are not better ranked than the current cell, the UE sorts all available neighbor cells based on the power level and filtered based on the MIN_RSSNR_THRESHOLD level and
    chooses the best ranked cell among available neighbor cells
    enables SIB1 reception on the neighbor cell (If neighbor cell SIB does not overlap with the serving cell SI, do not interrupt serving cell SI acquisition)
    if the neighbor cell also broadcasts PWS SIs, enable PWS SI reception on the neighbor cell (if the neighbor cell SI does not overlap with the serving cell SI, do not interrupt serving cell SI acquisition). It should be noted that the UE performs SIB1 & PWS SI reception on the neighbor cell while still camping on the current serving cell; if the paging occasion does not overlap with the neighbor cell SIB1 and PWS SI then there is no interruption to paging
    If SIB1 and PWS SI acquisition is successful on the neighbor cell then the UE bars the current cell and reselect to the neighbor cell
    else the UE repeats the same for the next cell of the remaining identified available neighbor cells or, if no more cells are available, the UE performs cell search on the recently camped frequencies.
  It the UE does not detect any suitable cells (where PWS SI acquisition is possible) within 10 s and it still observes the PWS SI acquisition failure then it bars and leaves the current cell and performs a regular cell selection procedure.

This allows reducing unnecessary power drain by avoiding unnecessary reselection attempts to a cell where PWS information reception is not possible either and at the same time increases the possibility to reselect to a better cell as early as possible by avoiding a temporary out-of-service.

An example is described in the following with reference to FIG. 3.

Figure 3:
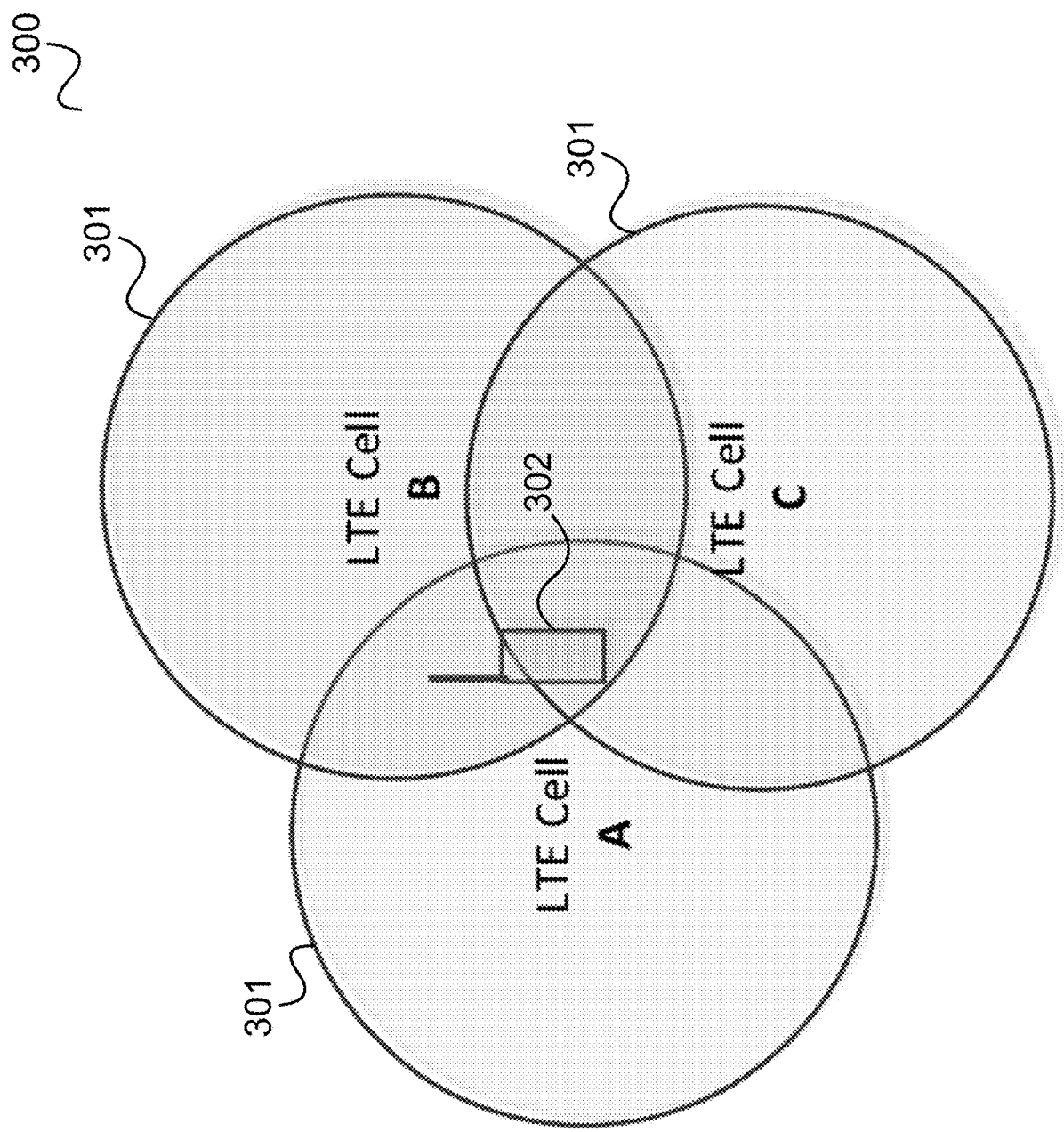
FIG. 3 shows a communication arrangement including three radio cells illustrating an example for cell reselection.

FIG. 3 shows a communication arrangement 300 including three radio cells 301 denoted as Cell A, Cell B and Cell C, for example corresponding to three of the radio cells 104 of the system of FIG. 1 and a UE 302, for example corresponding to mobile terminal 105.

It is assumed that LTE Cells A, B and C operate on the frequencies F1, F2 and F3 (same priority) respectively and PWS warning messages are broadcast within the cells 301.

Further, it is assumed that frequencies F2 and F3 are broadcast as neighbor frequencies in Cell A (SIB5).

The RSRP and RSRQ levels for the cells 104 are assumed to be Cell A>Cell B>Cell C, it is assumed that the RSRP of Cell A>S-non-intrasearch parameter from Cell A and it is assumed that the RSSNR level (for system information channel) to be Cell C>Cell B>Cell A (Interference created for Cell A and B for the System information channel (BCCH) especially on those locations where PWS SIBs are broadcast).

The UE 302 is assumed to camp on Cell A and paging information is sent to indicate PWS notification information broadcast but the UE 302 experiences a system information acquisition failure in cell A.

According to the approach described above, the UE 302 reacts to the system information acquisition failure for PWS SIs by enabling neighbor cell measurements to detect and to reselect to a suitable neighboring cell where the PWS SI acquisition is possible.

With the above assumptions, the UE reselects to cell C directly from cell A and does not return to cell A or reselect to cell B until the RSSNR for those cells gets better. Staying on cell A (where PWS SIs are not decodable), selecting to cell B or reselecting to cells A and cell B without any change/improvement in the RSSNR level for those cells is avoided.

A further example is described in the following with reference to FIG. 4.

Figure 4:
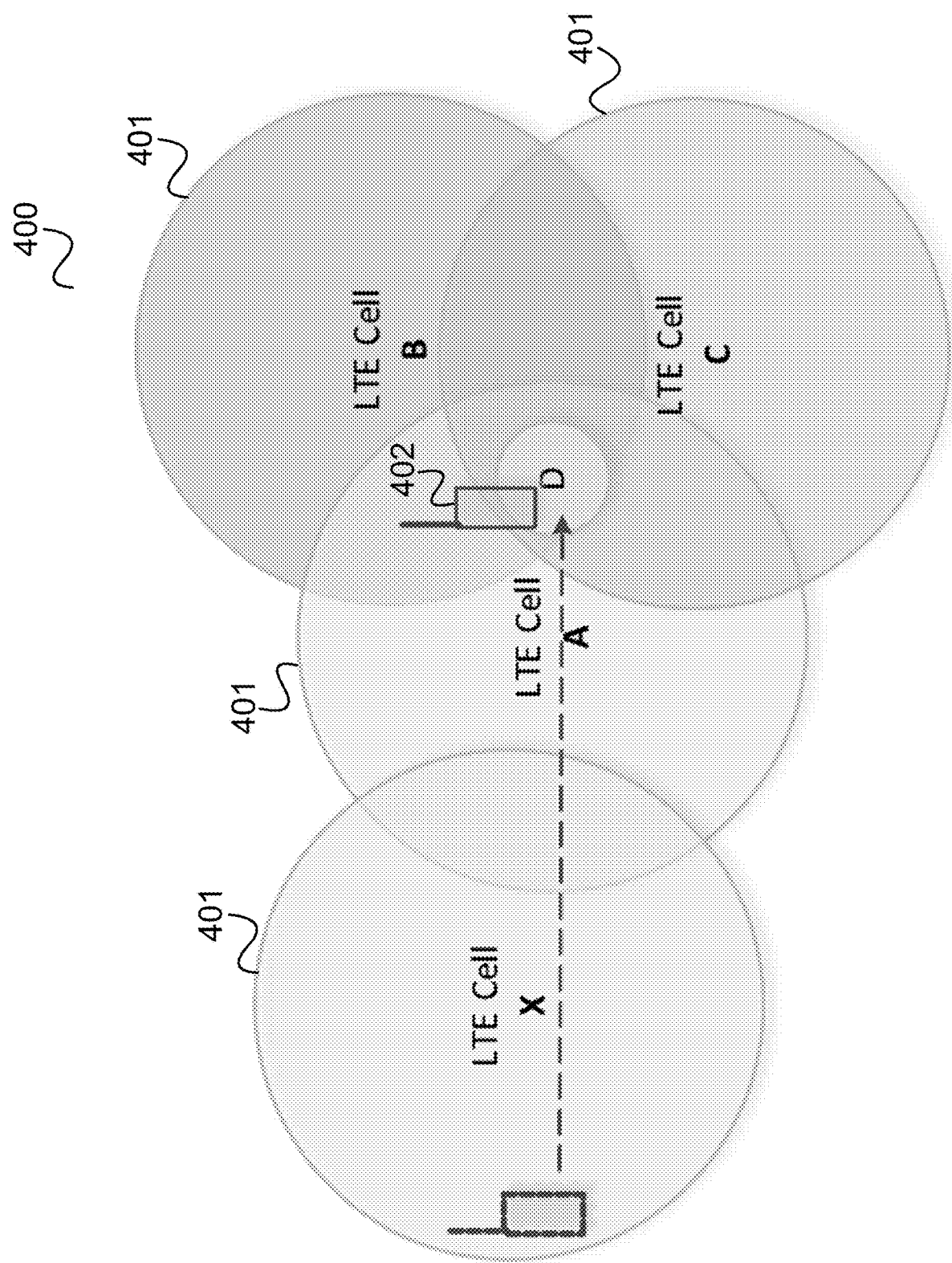
FIG. 4 shows a communication arrangement including five radio cells illustrating another example for cell reselection.

FIG. 4 shows a communication arrangement 400 including five radio cells 401 denoted as Cell A, Cell B, Cell C, Cell D and Cell X.

LTE Cells A, B, C operate on Frequencies F1, F2 and F3, respectively (same priority, priority 7) and are broadcasting PWS warning messages.

LTE Cells X and Cell D are on frequency F4 (same priority, priority 7) and are broadcasting PWS warning messages.

At a first time T1 only Cell X is switched-on and all other cells are switched-off, UE camps on Cell X RSRP of Cell X<S-non-intrasearch parameter from Cell X. Frequencies F1, F2 and F3 are assumed to be broadcast as neighbor frequencies in Cell X and frequencies F2 and F3 are assumed to be broadcast as neighbor frequencies in in Cell A (via SIB5).

At a second time T2 Cells A, B, C and D are switched-on. The RSRP and RSRQ level are assumed to be Cell A>Cell X>Cell B>Cell C>Cell D. UE reselects to Cell A and RSRP Cell A>S-non-intrasearch parameter from Cell A.

The RSSNR levels (for system information channel) are assumed to be Cell D>Cell C>Cell B>Cell A (Interference created for Cell A and B for the System information channel (BCCH) especially on those locations where PWS SIBs are broadcast).

PWS SIs are assumed to be scheduled on cells A, B, C and D. In this setup both Cell C and Cell D are suitable to receive PWS SIs. But Cell D and its frequency are not part of SIB5 in Cell A, Cell B and Cell C. Paging is sent in cell A to indicate a PWS Warning notification broadcast but the UE 402 experiences a system information acquisition failure in cell A.

According to the approach described above, the UE 402 reacts to the system information acquisition failure for PWS SIs by enabling neighbor cell measurements to detect and to reselect to a suitable neighboring cell where the PWS SI acquisition is possible.

With the above assumptions, the UE ends up in Cell C directly from Cell A and does not return to Cell A or reselect to Cell B until the RSSNR for those cells get better. It is avoided that the UE reacts to the PWS system information acquisition failure too early by entering out-of-service and performing cell search/selection and selects cell D (through cell search & cell selection) before identifying that cell C is suitable.

As another example, it is assumed in the scenario of FIG. 4 that cell C is also not suitable for PWS SI acquisition. This means that only cell D is suitable for PWS SI acquisition but this is not part of neighbor cell frequencies to measure in SIB5 in any of cells A, B and C.

According to approach described above, the UE would end up in Cell D after the 10 second maximum timer once PWS SI acquisition failure is detected in Cell A. It can be achieved that the UE detects & reselects to cell D although it is not part of SIB5 in Cell A, B & C.

Figure 5:
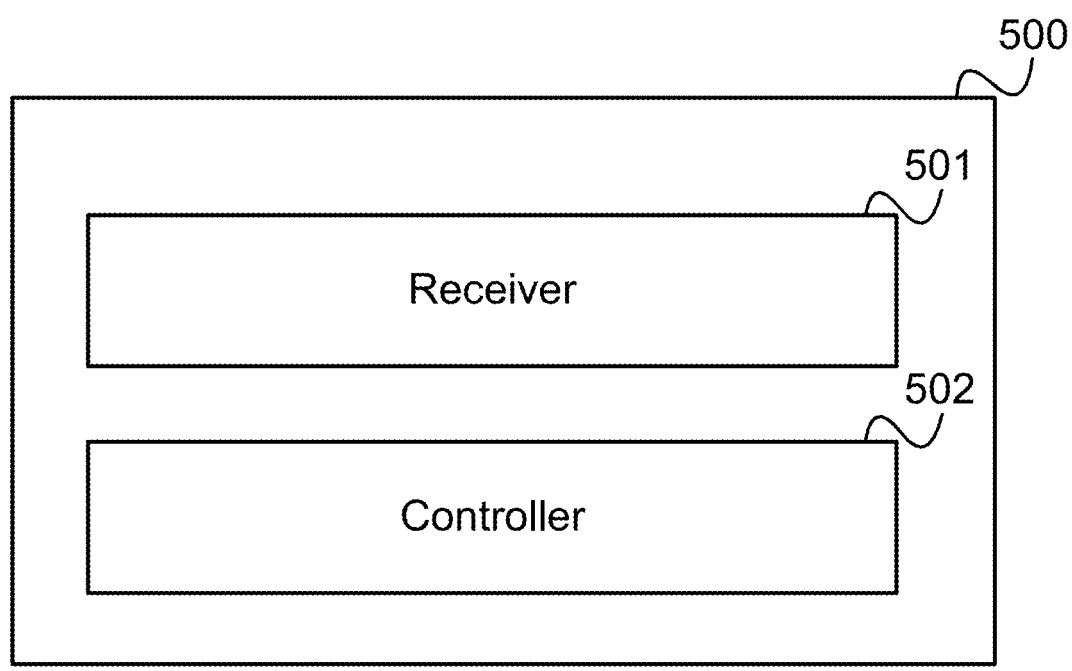
FIG. 5 shows an apparatus of a user equipment adapted for receiving emergency notification information used in mobile communication.

In summary, according to various examples, an apparatus is provided as illustrated in FIG. 5.

FIG. 5 shows an apparatus 500 of a user equipment (UE) adapted for receiving emergency notification information used in mobile communication.

The apparatus 500 includes a receiver 501 configured to receive the emergency notification information from a first radio cell and, if it does not receive the emergency notification information from the first radio cell, search for a second radio cell to determine whether the receiver receives the emergency notification information from the second radio cell.

The apparatus 500 further includes a controller 502 configured to initiate a selection of the second radio cell based on the determination of reception of the emergency notification from the second radio cell.

According to various embodiments, in other words, a communication device searches for a different radio cell for reception of emergency notification information if it cannot receive emergency notification information in the radio cell on which it is currently camping, i.e. performs a cell reselection if it finds another radio cell which is suitable for reception of emergency notification information.

The components of the apparatus (or a communication device comprising the apparatus), e.g. the receiver and the controller, may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 6:
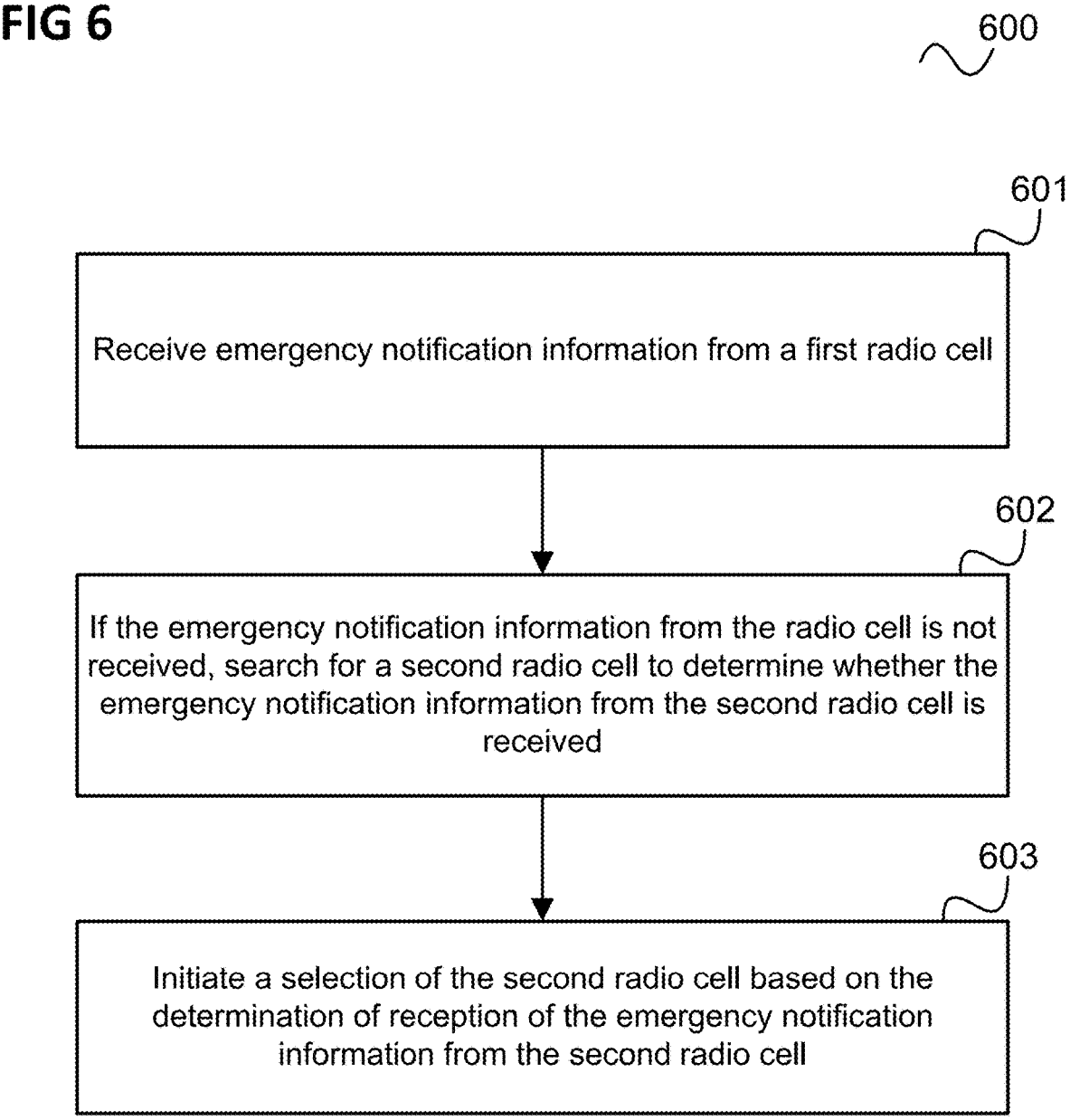
FIG. 6 shows a flow diagram illustrating a method for receiving emergency notification information.

The apparatus for example carries out a method as illustrated in FIG. 6.

FIG. 6 shows a flow diagram 600 illustrating a method for receiving emergency notification information, for example carried out by a communication device.

In 601, the communication device receives the emergency notification information from a first radio cell.

In 602, the communication device searches, if the emergency notification information of the radio cell is not received, for a second radio cell to determine whether the emergency notification information from the second radio cell is received.

In 603, the communication device initiates a selection of the second radio cell based on the determination of the emergency notification information from the second radio cell.

The following examples pertain to further embodiments.

Example 1 is an apparatus as shown in FIG. 5.

In Example 2, the subject matter of Example 1 may optionally include the receiver being configured to perform a radio cell selection and the first radio cell being a radio cell selected by the receiver.

In Example 3, the subject matter of any one of Examples 1-2 may optionally include the user equipment being camping on the first radio cell.

In Example 4, the subject matter of any one of Examples 1-3 may optionally include the emergency notification information being information broadcast in the first radio cell.

In Example 5, the subject matter of any one of Examples 1-4 may optionally include the emergency notification information being information broadcast by a base station operating the first radio cell.

In Example 6, the subject matter of any one of Examples 1-5 may optionally include the emergency notification information being information broadcast in one or more system information blocks in the first radio cell.

In Example 7, the subject matter of any one of Examples 1-6 may optionally include the receiver being configured to detect whether it receives emergency notification information of the first radio cell based on whether it can receive scheduling information for the emergency notification information.

In Example 8, the subject matter of any one of Examples 1-7 may optionally include the scheduling information being information broadcast in one or more system information blocks in the first radio cell.

In Example 9, the subject matter of any one of Examples 1-8 may optionally include the emergency notification information comprising Public Warning System information.

In Example 10, the subject matter of any one of Examples 1-9 may optionally include the emergency notification information comprising Earthquake and Tsunami Warning System information.

In Example 11, the subject matter of any one of Examples 1-10 may optionally include the receiver being configured to search for the second radio cell by trying to receive emergency notification information of the second radio cell.

In Example 12, the subject matter of any one of Examples 1-11 may optionally include the receiver being configured to search for the second radio cell irrespective of whether the first radio cell fulfills a predetermined measurement criterion.

In Example 13, the subject matter of any one of Examples 1-12 may optionally include the receiver being configured to detect whether it can receive emergency notification information of the first radio cell based on whether it was unable to receive emergency notification information of the first radio cell for a predetermined period.

In Example 14, the subject matter of any one of Examples 1-13 may optionally include the receiver being configured to search for the second radio cell among a set of neighboring radio cells of the second cell.

In Example 15, the subject matter of Example 14 may optionally include the receiver being configured to determine a reception quality for each neighboring cell of the set of neighboring radio cells and search for the second radio cell based on the reception qualities.

In Example 16, the subject matter of any one of Examples 1-15 may optionally include the controller being further configured to bar the first radio cell if the receiver has found the second radio cell based on the possibility to receive emergency notification information of the second radio cell.

Example 17 is a method for receiving emergency notification information as shown in FIG. 6.

In Example 18, the subject matter of Example 17 may optionally include performing a radio cell selection and the first radio cell being a radio cell selected.

In Example 19, the subject matter of any one of Examples 17-18 may optionally include camping on the first radio cell.

In Example 20, the subject matter of any one of Examples 17-19 may optionally include the emergency notification information being information broadcast in the first radio cell.

In Example 21, the subject matter of any one of Examples 17-20 may optionally include the emergency notification information being information broadcast by a base station operating the first radio cell.

In Example 22, the subject matter of any one of Examples 17-21 may optionally include the emergency notification information being information broadcast in one or more system information blocks in the first radio cell.

In Example 23, the subject matter of any one of Examples 17-22 may optionally include detecting whether emergency notification information of the first radio cell is received based on whether scheduling information for the emergency notification information is received.

In Example 24, the subject matter of any one of Examples 17-23 may optionally include the scheduling information being information broadcast in one or more system information blocks in the first radio cell.

In Example 25, the subject matter of any one of Examples 17-24 may optionally include the emergency notification information comprising Public Warning System information.

In Example 26, the subject matter of any one of Examples 17-25 may optionally include the emergency notification information comprising Earthquake and Tsunami Warning System information.

In Example 27, the subject matter of any one of Examples 17-26 may optionally include searching for the second radio cell by trying to receive emergency notification information of the second radio cell.

In Example 28, the subject matter of any one of Examples 17-27 may optionally include searching for the second radio cell irrespective of whether the second radio cell fulfills a predetermined measurement criterion.

In Example 29, the subject matter of any one of Examples 17-28 may optionally include detecting whether emergency notification information of the first radio cell is receivable based on whether emergency notification information of the radio cell has not been received for a predetermined period.

In Example 30, the subject matter of any one of Examples 17-29 may optionally include searching for the second radio cell among a set of neighboring radio cells of the first radio cell.

In Example 31, the subject matter of any one of Examples 17-30 may optionally include determining a reception quality for each neighboring cell of the set of neighboring radio cells and searching for the second radio cell based on the reception qualities.

In Example 32, the subject matter of any one of Examples 17-31 may optionally include barring the first radio cell if the receiver has found the second radio cell based on the possibility to receive emergency notification information of the second radio cell.

According to a further example, a communication device is provided comprising a transceiver which is configured to, in response to a reception failure of emergency notification information of a radio cell, search for a neighboring radio cell suitable for emergency notification information and reselect to the neighboring radio cell suitable for emergency notification information.

According to a further example, a communication device is provided comprising a receiver configured to detect whether it can receive emergency notification information of a radio cell and if it cannot receive the emergency notification information of the radio cell, search for another radio cell based on the possibility to receive emergency notification information of the other radio cell, a controller configured to, if the receiver has found another radio cell based on the possibility to receive emergency notification information of the other radio cell, initiate a reselection of the other radio cell.

According to a further example, a method for receiving emergency notification information is provided comprising detecting whether emergency notification information of a radio cell is receivable, if the emergency notification information of the radio cell is not receivable, searching for another radio cell based on the possibility to receive emergency notification information of the other radio cell, if another radio cell based on the possibility to receive emergency notification information of the other radio cell has been found, initiating a reselection of the other radio cell.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. An apparatus of a user equipment (UE) adapted for receiving emergency notification information used in mobile communication, the apparatus comprising:
   a receiver configured:
      to detect receipt of emergency notification information of a first radio cell based on whether the receiver can receive scheduling information for the emergency notification information;
      to determine that an emergency notification system information acquisition failure has occurred when the receiver is unable to decode emergency system information from the first radio cell within a pre-determined window of time;
to search for a second radio cell based on the determination that the emergency notification system information acquisition failure has occurred;
to determine whether the receiver receives the emergency notification system information sent from the second radio cell; and
a controller configured to initiate a cell reselection from the first radio cell to the second radio cell based on the determination of reception of the emergency notification system information sent from the second radio cell.

2. The apparatus of claim 1, wherein the receiver is configured to perform a radio cell selection and the first radio cell is a radio cell selected by the receiver.

3. The apparatus of claim 1, wherein the user equipment is camping on the first radio cell.

4. The apparatus of claim 1, wherein the emergency notification information is information broadcast in the first radio cell.

5. The apparatus of claim 1, wherein the emergency notification information is information broadcast by a base station operating the first radio cell.

6. The apparatus of claim 1, wherein the emergency notification information is information broadcast in one or more system information blocks in the first radio cell.

7. The apparatus of claim 1, wherein the scheduling information is information broadcast in one or more system information blocks in the first radio cell.

8. The apparatus of claim 1, wherein the emergency notification information comprises Public Warning System information.

9. The apparatus of claim 1, wherein the emergency notification information comprises Earthquake and Tsunami Warning System information.

10. The apparatus of claim 1, wherein the receiver is configured to search for the second radio cell by trying to receive emergency notification information of the second radio cell.

11. The apparatus of claim 1, wherein the receiver is configured to search for the second radio cell irrespective of whether the first radio cell fulfills a predetermined measurement criterion.

12. The apparatus of claim 1, wherein the receiver is configured to search for the second radio cell among a set of neighboring radio cells of the first radio cell.

13. The apparatus of claim 12, wherein the receiver is configured to determine a reception quality for each neighboring cell of the set of neighboring radio cells and search for the second radio cell based on the reception qualities.

14. The apparatus of claim 1, wherein the controller is further configured to bar the first radio cell when the receiver has found the second radio cell based on the determination of reception of the emergency notification system information of the second radio cell.

15. A method for receiving emergency notification information for a user equipment device; wherein the method comprises:

detecting receipt of emergency notification information of a first radio cell based on whether a receiver of the user equipment device can receive scheduling information for the emergency notification information;
determining that an emergency notification system information acquisition failure has occurred when the receiver is unable to decode an emergency system information message from the first radio cell within a pre-determined window of time;
searching for a second radio cell based on the determination that the emergency notification acquisition failure has occurred;
determining whether the emergency notification information sent from the second radio cell is received; and
initiating a cell reselection from the first radio cell to the second radio cell based on the determination of reception of the emergency notification information sent from the second radio cell.

16. The method of claim 15, comprising performing a radio cell selection and the first radio cell being a radio cell selected.

17. The method of claim 15, comprising camping on the first radio cell.

18. The method of claim 15, wherein the emergency notification information is information broadcast in the first radio cell.

19. A user equipment device (UE), comprising:
a receiver; and
a controller;
wherein the UE is configured to:
detect receipt of emergency notification information of a first radio cell based on whether the receiver can receive scheduling information for the emergency notification information;
determine, via the receiver, that an emergency notification system information acquisition failure has occurred when the receiver is unable to decode emergency system information from a first radio cell within a pre-determined window of time;
search, via the receiver, for a second radio cell based on the determination that the emergency notification system information acquisition failure has occurred;
determine, via the receiver, whether the receiver receives the emergency notification system information sent from the second radio cell; and
initiate, via the controller, a cell reselection from the first radio cell to the second radio cell based on the determination of reception of the emergency notification system information sent from the second radio cell.

20. The UE of claim 19,
wherein the UE is further configured to:
bar, via the controller, the first radio cell when the receiver has found the second radio cell based on the determination of reception of the emergency notification system information of the second radio cell.

\* \* \* \* \*